United States Patent [19]

Freitag

[11] Patent Number: 6,108,925
[45] Date of Patent: *Aug. 29, 2000

[54] LENGTH MEASUREMENT SYSTEM

[75] Inventor: Hans-Joachim Freitag, Jena, Germany

[73] Assignee: Dr. Johannes Heidenhain GmbH, Traunreut, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/042,821

[22] Filed: Mar. 17, 1998

[30] Foreign Application Priority Data

Mar. 18, 1997 [DE] Germany .............................. 197 11 271

[51] Int. Cl.⁷ ............................................ B26D 7/28
[52] U.S. Cl. ................................ 33/706; 33/655; 33/710; 68/23.1
[58] Field of Search ............................... 33/707, 706, 708, 33/710, 655, 482, 483, 484, 485, 492; D32/25; 68/23.1, 23.3; 280/DIG. 1, 5.507, 5.508, 5.509, 5.513, 6.15, 6.153, 6.154, 6.16; 180/41; 356/375; 250/231.13, 231.14, 231.16; 324/207.24

[56] References Cited

U.S. PATENT DOCUMENTS

| | | | |
|---|---|---|---|
| 3,816,002 | 6/1974 | Wieg | 356/395 |
| 3,906,801 | 9/1975 | Butler | 73/457 |
| 4,368,637 | 1/1983 | Anderson | 73/652 |
| 4,541,181 | 9/1985 | Giacomello | 33/707 |
| 4,570,346 | 2/1986 | Burkhardt | 33/706 |
| 4,786,803 | 11/1988 | Majette et al. | 250/237 G |
| 4,831,737 | 5/1989 | Grund | 33/702 |
| 4,950,079 | 8/1990 | McMurtry et al. | 33/503 |
| 5,258,707 | 11/1993 | Begin et al. | 324/207.13 |
| 5,375,338 | 12/1994 | Nelle | 33/702 |
| 5,619,133 | 4/1997 | Shank et al. | 324/207.24 |
| 5,713,221 | 2/1998 | Myers et al. | 68/12.06 |
| 5,893,279 | 4/1999 | Schantz et al. | 68/12.06 |

FOREIGN PATENT DOCUMENTS

| | | |
|---|---|---|
| 297 234 | 1/1992 | Germany . |
| 297 261 | 1/1992 | Germany . |
| 91 16 892 U | 8/1994 | Germany . |
| 44 38 079 | 5/1996 | Germany . |
| 6-091399 | 4/1994 | Japan . |

*Primary Examiner*—Andrew H. Hirshfeld
*Assistant Examiner*—R A Smith
*Attorney, Agent, or Firm*—Reed Smith Shaw & McClay LLP

[57] ABSTRACT

A length measurement system for measuring the relative position of two objects in a given measuring direction comprises a scale carrier which carries a measurement scale and which is fastened to a first of the two objects and a scanning head which scans the measurement scale at a scanning location and is fastened to the second of the two objects. The scale carrier is constructed so as to be stiff in the longitudinal direction but can deflect in a springing manner vertical to the measuring direction and is fastened by only one of its ends to the first object, while its other end projects freely. The scale carrier is positively guided in the region of the scanning head.

11 Claims, 2 Drawing Sheets

LENGTH MEASUREMENT SYSTEM

BACKGROUND OF THE INVENTION a) Field of the Invention

The invention is directed to a length measurement system for measuring the relative position of two objects in a given measuring direction comprising a scale carrier which carries a measurement scale and which is fastened to the first of the two objects, and comprising a scanning head which scans the measurement scale at a scanning location and is fastened to the second of the two objects.

b) Description of the Related Art

Length measurement systems of this type are preferably used for measuring relative movements between two machine components, one of which is stationary and the other movable. For this purpose, the guidance of the scanning head relative to the scale on the scale carrier is generally subject to exacting requirements, specifically with respect to the positional tolerances vertical to the measuring direction as well as with respect to rotational tolerances. In machine tool building and in many other areas of application, the machine guides do not meet these exacting requirements, especially in the case of large static and dynamic load variations, so that the scanning head is held in a special measurement carriage which is guided on an auxiliary guide internal to the measurement system, which auxiliary guide is oriented in a highly precise manner with respect to the scale carrier (company publication "NC Length Measurement Systems [NC-Längenmeßsysteme]", Heidenhain, June 1996, regarding the LS 106 length measurement system). In order to compensate for the guiding operation of the two guides relative to one another, coupling members which are stiff in the measuring direction, but otherwise soft or flexible, are arranged between a driver that is fixedly fastened to a first machine element and the measurement carriage which runs on the auxiliary guide in the measurement system.

In an arrangement described in the company publication "NC Linear Encoders", Heidenhain, July 1994, a spherical surface which contacts an aligned contact surface under pretensioning by a tension spring is used as a coupling member. The occurring guiding errors are compensated via sliding movements and tilting between the spherical surface and contact surface. A similar solution is also indicated in DE 39 08 260 C1, in which the coupling is formed by a plane surface at the measurement carriage and by a second plane surface at the driver and a ball that is arranged between the two surfaces and constantly held in contact with the two contact surfaces via a spring. However, the frictional engagement type coupling that is compelled by the spring requires high spring forces on the one hand and, in order to reduce Hertzian indentations, hardened contact surfaces between the ball and driver and between the ball and measurement carriage. Further, a great deal of effort is required with respect to manufacturing and alignment in order to orient the contact surfaces so as to be exactly vertical to the measuring direction.

All of the solutions mentioned above have the great disadvantage that only relatively small deviations can be compensated.

In another known arrangement (DD 245 482 A1), an elastic measurement tape which is clamped in at both sides viewed in the longitudinal direction and is positively guided by means of special guide elements in the scanning head is used to compensate for travel errors. This solution also only enables compensation for small travel errors because, otherwise, the mechanical stresses in the elastic scale carrier are too great. In short measurement systems, above all, the required deflection forces may be excessive.

OBJECT AND SUMMARY OF THE INVENTION

On this basis, the primary object of the invention is to propose a length measurement system which operates in a simple manner and which also makes it possible to compensate for relatively large guide tolerances.

According to the invention, this object is met in a measurement system of the type mentioned above in that the scale carrier is constructed so as to be stiff in the longitudinal direction, but can deflect in a resilient or springing manner vertical to the measuring direction and is fastened by only one of its ends to the first object, while its other end projects freely, wherein the scale carrier is positively guided in the region of the scanning head.

The advantageous suitability of the measurement system according to the invention resides first in the fact that it has excellent linear response over a large measuring range in small steps, wherein the special advantage consists in that a large distance can be spanned between the measurement location (scanning head) and the fastening location for the scale carrier. In addition, the measurement system according to the invention is especially economical and can be assembled very easily. However, it also has the further advantage that no direct connection is required between the parts that are movable relative to one another (for example, with respect to the guidance of one part relative to another part).

In the measurement system according to the invention, there is no difficulty involved in configuring the positive guidance of the scale carrier in the region of the scanning head in such a way that the changes in attitude of the measurement scale in relation to the scanning head are always less than the permissible scanning tolerances.

The arrangement of a suitable positive guidance in the region of the scanning head provides the possibility of arranging the positively guiding elements within an appropriate region depending on usefulness. However, it is especially preferable to arrange the elements for the positive guidance of the scale carrier in such a way that the scale carrier is positively guided directly at the scanning location of the scanning head or directly in front of or directly behind the same.

The measuring system according to the invention achieves an advantage particularly in that in order to compensate for greater guidance tolerances between the scanning head and the scale carrier, the technically complicated and very elaborate solutions for the coupling of the scanning head as well as the coupling of the scale carrier as used in the prior art can be solved by means of fastenings which are very simple to realize.

The scale carrier which is fastened at only one end can be arranged inside the length measurement system according to the invention in any suitable manner. In an especially preferred manner, however, the scale carrier is arranged so as to be suspended, so that there is accordingly a vertically extending or virtually vertically extending measuring direction.

A particularly preferable construction of the length measurement system according to the invention also consists in that the scale carrier is fastened to the first object in such a way that it is swivelable laterally to the measuring direction, which can preferably be carried out, e.g., by means of a rotating rivet connection or the like. Further, the scale carrier is advantageously fastened to the first object by means of a cardanic articulation arrangement which makes it possible to compensate without difficulty for deflections lateral to the longitudinal direction of the measurement scale and lateral to the measuring direction as well as for deflections vertical thereto and for deflections due to rotations about the longitudinal axis of the scale carrier.

In the length measurement system according to the invention, it is particularly preferable that the scale carrier is constructed in the form of a strip in which the cardanic articulation arrangement is formed of two lateral notches or cut out portions on both sides of the scale carrier at the same longitudinal position of the scale carrier (in the form of a wasp-waist articulation, as it is called), between which there remains a center web of the scale carrier which is substantially thinner than the width of the scale carrier, this center web preferably having a maximum width of 50% of the total width of the scale carrier strip, especially preferably only 20 to 40% of its total width, and most preferably one third of its total width. Arrangements of this type at strip-shaped carriers form cardanic articulation arrangements which can be arranged without difficulty already at the manufacturing stage of the scale carrier and do not generate high costs, but nevertheless ensure a very effective cardanic effect with high stiffness in the longitudinal direction at the same time.

Another preferred construction of the length measurement system according to the invention consists in that the measurement scale is not arranged directly on the scale carrier, but rather on a thin tape or strip which is longitudinally stiff in its longitudinal and measuring direction, but flexible vertical thereto and which is connected with the scale carrier by means of the capillary action of a thin, viscous intermediate layer. The scale carrier is preferably a steel strip with a ground and polished surface and with rounded longitudinal edges. However, equally preferably, the scale carrier can also be a wire which is stiff in the longitudinal direction, but elastically springing in the direction vertical thereto.

In the construction of the scale carrier as an elastic steel strip or metal strip which is fastened by only one end to the first object and is positively guided in the region of the scanning head, a guidance offset vertical to the measuring direction and rotation about the longitudinal axis as well as rotation about an axis extending vertical thereto can be compensated for without difficulty as a result of the elasticity of the metal strip.

By constructing the scale carrier and measurement scale as separate strip-shaped bodies which are connected with one another by means of the capillary action of a thin viscous intermediate layer and by providing a flexible strip-shaped scale which is decoupled along a bending line, it is possible for the substantial bending error components which occur when compensating for large travel errors and tilting errors in the case of relatively extensive bending to be favorably compensated. The coupling is generated by the capillary action of the viscous intermediate layer between the two strips, wherein the strips are simultaneously extensively decoupled with respect to mechanical stresses. This is due to the fact that these strips are no longer cemented together, but rather float relative to one another on a viscous film with a thickness of only a few micrometers. In the case of lower displacement speeds of the strips relative to one another, no noteworthy transfer of force occurs between the two strips. As a result of the relatively extensive capillary action of this thin intermediate layer, the strips are nevertheless held together fixedly and form a stable composite. At faster displacement speeds between the strips, the friction between the strips and the intermediate layer increases sharply, so that high stability is achieved also in the longitudinal direction of the composite. Due to this type of coupling, occurring bending stresses in the individual strips are sharply reduced, especially in the thin measurement strip, since the stresses in the individual strips in the case of gradually proceeding bending movements build up so as to be extensively decoupled from one another and the occurring bending stresses also remain very small due to the small thickness. Accordingly, the occurring longitudinal error resulting from bending is also sharply reduced and is negligibly small for most measurement tasks. However, the viscous intermediate layer also provides for a vibration damping of the strip composite compared to a thicker strip.

The length measurement system according to the invention can be easily and simply used in a very advantageous manner in a wide range of applications. However, the use of the length measurement system according to the invention in a level regulation system in vehicles or for measuring the deflection of drums mounted in cantilever manner in washing machines or spin driers is particularly advantageous.

The invention is explained in principle more fully hereinafter by way of example with reference to the drawings.

BRIEF DESCRIPTION OF THE DRAWINGS

In the drawings:

FIGS. 1 and 2 show a schematic view of a measurement system according to the invention which is used for measuring the relative position between a stationary object and a second object which is mounted in cantilever manner at the stationary object, wherein FIG. 1 shows the initial position (zero position) and FIG. 2 shows the arrangement after a deflection has taken place;

DESCRIPTION OF THE PREFERRED EMBODIMENTS

Figure 1:
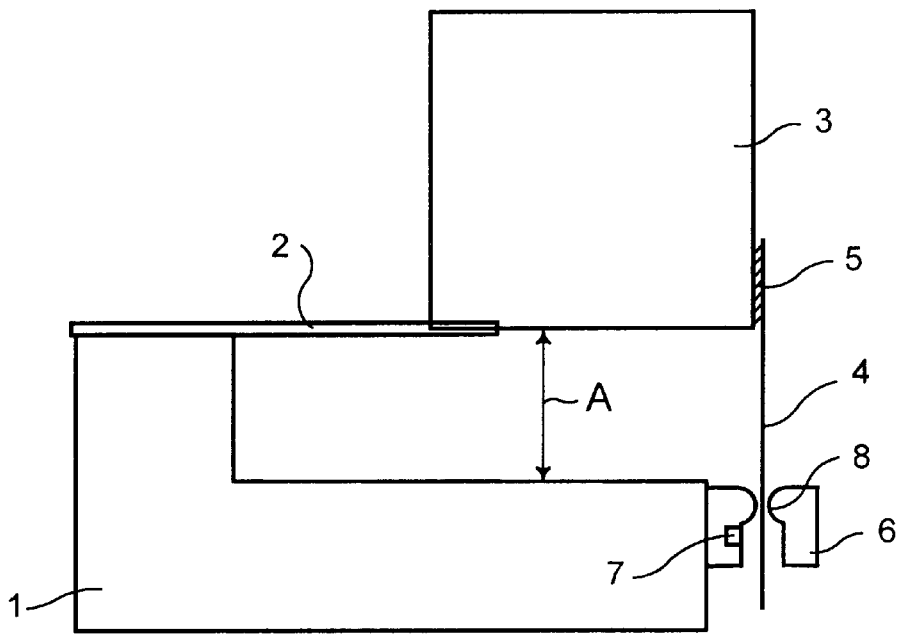
Figure 2:
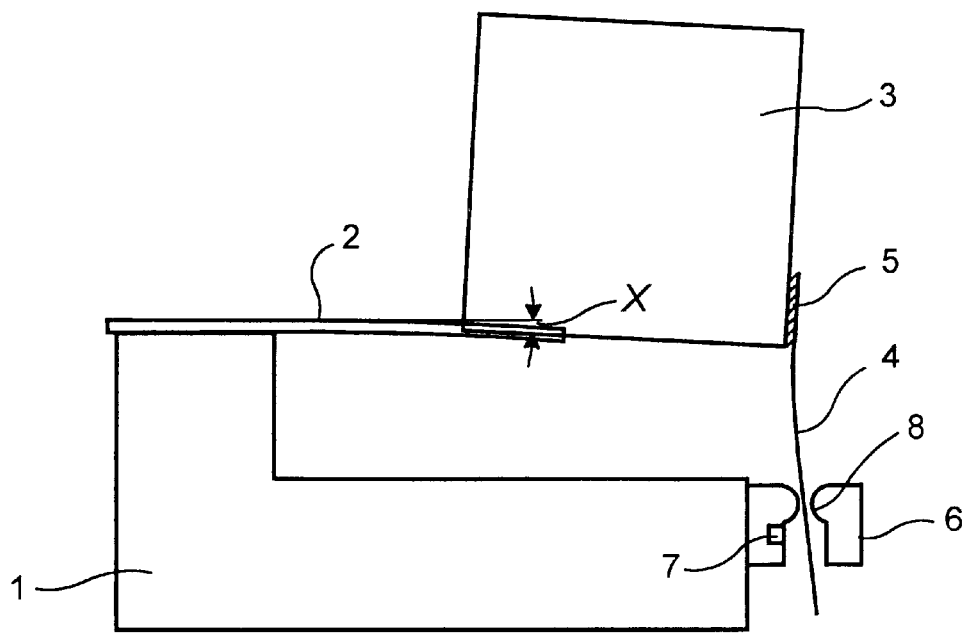

FIGS. 1 and 2 are purely schematic views showing an object 1 having an elongated base body which is provided at its one free end with a portion which projects upward. One end of a holding arm 2 is rigidly fastened to this upwardly projecting portion at the top. The holding arm 2 projects laterally over the upper portion of the object 1 and carries at its freely projecting end an object 3 which is situated in the zero position (initial position) shown in FIG. 1 at a distance A above the base body of the object 1. A scale carrier 4 provided with a measurement scale is suitably fastened in a suspended arrangement by its upper end 5 to the object 3 on the side of the object 3 remote of the fastening location at the holding arm 2, as will be further discussed hereinafter.

The scale carrier 4 which carries a suitable measurement scale projects in its lower region into a scanning head 6 which is provided with a scanning device 7 at a scanning location. A positive guide 8 for the scale carrier 4, which positive guide 8 is shown schematically in FIGS.1 and 2 in the form of two round surfaces projecting toward one another, is formed above the scanning device 7 at the scanning head 6 and is arranged, as is shown in FIGS. 1 and 2, directly in front of the scanning device 7 in the direction in which the scale carrier 4 travels through the scanning head 6. The positive guide 8 which could also be provided in an effective manner directly behind the scanning device 7 or at the scanning location 6 ensures that the scale carrier 4, with its measurement scale at the scanning location, i.e., at the region of the scanning location located adjacent to the scanning device 7 at which the scanning is carried out, will not undergo a deflection relative to the scanning device 7 that is greater than that permissible for proper execution of scanning.

The arrangement, shown schematically in FIGS. 1 and 2, of the objects 1 and 3 relative to one another, wherein object 3 is suspended in cantilever manner at object 1, corresponds in principle to the arrangement of the centrifugal drum (corresponding to object 3) relative to the housing frame (corresponding to object 1) in washing machines or spin driers.

In an arrangement of this kind, for example, in a spin drier, when the (cantilevered) centrifugal drum (object 3) is loaded with wash, there occurs a small deflection or lowering X of the drum (corresponding to object 3) in the downward direction toward object 1 as is shown schematically in FIG. 2. In this case, the scale carrier 4 which is formed so as to be longitudinally stiff as a polished ground steel strip with rounded lateral edges, but which can deflect in a springing manner vertical to its longitudinal plane (and accordingly to the plane of the measurement scale) is pushed into the scanning head 6 corresponding to deflection X as is shown schematically in FIG. 2. Due to the capability of the scale carrier 4 to deflect in a springing manner, the resulting lateral offset can be compensated without difficulty, wherein the positive guidance 8 ensures that the traversing position of the scale carrier 4 relative to the scanning head 6 is always maintained, i.e., remains constant, at this location and the scanning device 7 which directly follows the positive guide 8 in the embodiment example shown in the drawing can carry out the desired scanning of the measurement scale at the scanning location without exceeding the permissible spacing tolerance or distance tolerance relative to the scanning device 7 required for proper measurement.

Figure 3:
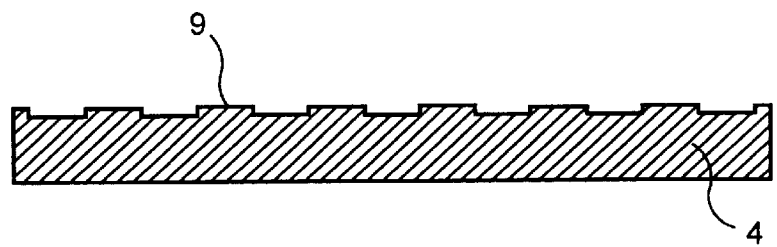
FIGS. 3 and 4 show schematic longitudinal sections through two different embodiment forms for a scale carrier with a measurement scale which can be used in the invention.
Figure 4:
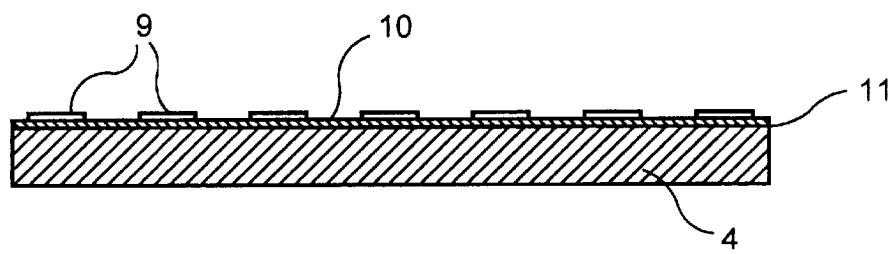

FIGS. 3 and 4 show longitudinal sections through two different constructions of the scale carrier 4 with the measurement scale 9.

In the construction according to FIG. 3, the strip-shaped scale carrier 4 has raised portions on its surface which extend transverse to its longitudinal direction and which form the measurement scale 9.

In the arrangement shown in longitudinal section in FIG. 4, the strip-shaped scale carrier 4 is not provided with the measurement scale 9 directly on its surface. Rather, a thin strip 10 lies on the scale carrier 4, and the measurement scale 9 is suitably printed, etched or arranged in some other manner on its surface.

While the scale carrier 4 is longitudinally stiff, but can be deflected in a springing manner vertically thereto, the thinner strip 10 carried by it is likewise longitudinally stiff, but is flexible vertical to its surface, so that it can easily follow a springing deflection of the scale carrier 4. The scale carrier 4 and strip 10 with the measurement scale 9 are connected with one another via a thin viscous intermediate layer 11, i.e., by means of the capillary forces acting therein. This makes it possible for the strip 10 to be displaced relative to the scale carrier 4 in its longitudinal direction during slow movements, while it always remains connected therewith by the capillary forces.

Figure 5:
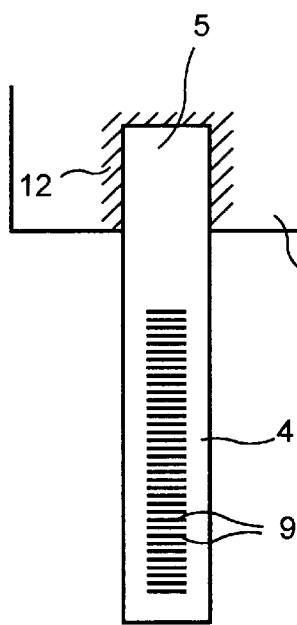
FIGS. 5, 6 and 7 show schematic views of three different arrangements for fastening the scale carrier and its configuration in a measurement system according to the invention.
Figure 6:
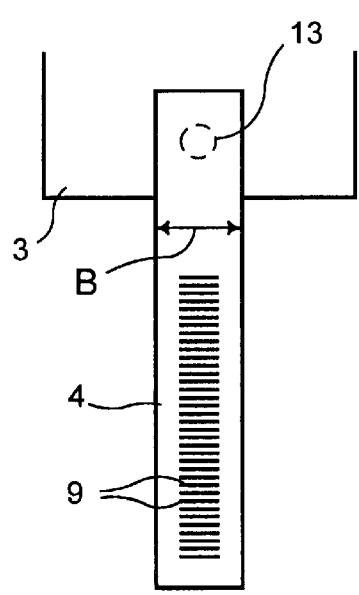
Figure 7:
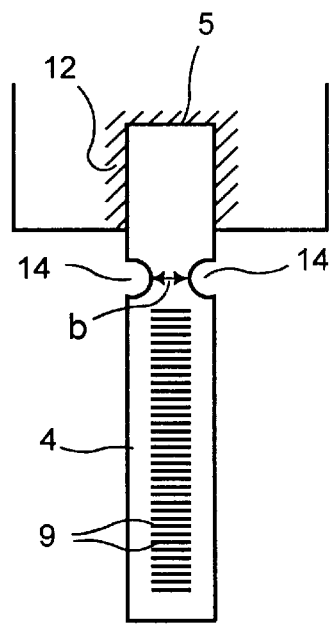

Finally, different possibilities for fastening the scale carrier 4 to the object 3 are shown in FIGS. 5 to 7.

In the arrangement in FIG. 5, the upper end 5 of the scale carrier 4 carrying the measurement scale 9 is fixedly fastened to the object 3 by means of a weld. In this arrangement, the scale carrier 4 can be bent in a springing manner vertical to its longitudinal direction (that is, perpendicular to the drawing plane in the view shown in FIG. 5), but is stiff in the longitudinal direction.

The view according to FIG. 6 shows a connection of the upper end 5 of the scale carrier 4 to the object 3 via a rivet connection 13, so that a longitudinally rigid fastening is ensured in the longitudinal direction of the scale carrier 4, while the scale carrier 4 is bendable in a springing manner not only vertical to the longitudinal direction (perpendicular to the drawing plane), but, in addition, can also be swiveled laterally about the fastening rivet 13 (or around another suitable articulation).

Finally, in the view according to FIG. 7, the upper end 5 of the scale carrier 4 is again fastened to the object 3 by means of a weld 12. However, the scale carrier 4 is provided with two lateral semicircular recesses 14 facing one another at only a small intervening distance from the object 3, wherein a center web with width b remains between the recesses 14, this width b being appreciably smaller than the width B of the scale carrier 4, and is preferably 50% or less, especially preferably 5% to 30% smaller, and most preferably advantageously amounts to one fifth of width B. Of course, instead of the semicircular recesses 14 shown in FIG. 7, other shapes of the recesses 14 can also be provided, especially lateral cut out portions which are V-shaped in cross section or in the form of slits, all of which, however, result in a cardanic arrangement in the sense of a wasp-waist, as it is called, and in a cardanic suspension of the portion of the scale carrier 4 located below this location relative to its portion located above and rigidly fastened to the second object 3.

While the foregoing description and drawings represent the preferred embodiments of the present invention, it will be obvious to those skilled in the art that various changes and modifications may be made therein without departing from the true spirit and scope of the present invention.

What is claimed is:

1. A length measurement system including two objects, said system measuring the relative position of the two objects in a given measuring direction comprising:

a scale carrier which carries a measurement scale and which is fastened to a first of the two objects said scale carrier having a length from one end to an opposite end wherein said length and said opposite end are suspended and said scale carrier is supported by said one end; and a scanning head which scans the measurement scale at a scanning location and is fastened to the second of the two objects;

said scale carrier being constructed so as to be stiff in the longitudinal direction, but being able to deflect in a springing manner perpendicular to the longitudinal direction, said scale carrier being positively guided on at least one side in the region of the scanning head.

2. The length measurement system according to claim 1, wherein the scale carrier is positively guided at the scanning location of the scanning head.

3. The length measurement system according to claim 1, wherein the scale carrier is positively guided directly in front of or directly behind the scanning location of the scanning head.

4. The length measurement system according to claim 1, wherein the scale carrier and the measurement scale are constructed as separate strip-shaped bodies, wherein the measurement scale is arranged on a strip which is longitudinally stiff, but flexible perpendicular thereto and which is connected with the scale carrier by means of the capillary action of a thin, viscous intermediate layer.

5. The length measurement system according to claim 1, wherein the scale carrier is a steel strip with a ground and polished surface and with rounded longitudinal edges.

6. The length measurement system according to claim 1, wherein the scale carrier is an elastically springing wire.

7. A length measurement system including two objects, said system measuring the relative position of the two objects in a given measuring direction comprising:

a scale carrier which carries a measurement scale and which is fastened to a first of the two objects; and a scanning head which scans the measurement scale at a scanning location and is fastened to the second of the two objects;

said scale carrier being constructed so as to be stiff in the longitudinal direction, but being able to deflect in a springing manner perpendicular to the longitudinal direction and being fastened by only one of its ends to the first object, with its other end projecting freely, said scale carrier being positively guided on at least one side in the region of the scanning head, and wherein the scale carrier is fastened to the first objects so as to be swivelable.

8. A length measurement system including two objects, said system measuring the relative position of the two objects in a given measuring direction comprising:

a scale carrier which carries a measurement scale and which is fastened to a first of the two objects; and a scanning head which scans the measurement scale at a scanning location and is fastened to the second of the two objects;

said scale carrier being constructed so as to be stiff in the longitudinal direction, but being able to deflect in a springing manner perpendicular to the longitudinal direction and being fastened by only one of its ends to the first object, with its other end projecting freely, said scale carrier being positively guided on at least one side in the region of the scanning head, and wherein the scale carrier is fastened to the first objects by means of a cardanic articulation arrangement.

9. The length measurement system according to claim 8, wherein the scale carrier is constructed in the form of a strip and the cardanic articulation arrangement is formed of two lateral notches or cut out portions on both sides of the scale carrier at the same longitudinal position of the scale carrier, between which there remains a center web of the scale carrier which is substantially thinner than the width of the scale carrier.

10. A method of using a length measurement system including two objects, said system measuring the relative position of two objects in a given measuring direction comprising a scale carrier which carries a measurement scale and which is fastened to a first of the two objects and a scanning head which scans the measurement scale at a scanning location and is fastened to the second of the two objects, said scale carrier being constructed so as to be stiff in the longitudinal direction, but being able to deflect in a springing manner perpendicular to the longitudinal direction and being fastened by only one of its ends to the first object, with its other end projecting freely, said scale carrier being positively guided in the region of the scanning head, said method comprising the step of using said length measurement system in a level regulating system for vehicles.

11. A method of using a length measurement system including two objects, said system measuring the relative position of the two objects in a given measuring direction comprising a scale carrier which carries a measurement scale and which is fastened to a first of the two objects and a scanning head which scans the measurement scale at a scanning location and is fastened to the second of the two objects, said scale carrier being constructed so as to be stiff in the longitudinal direction, but being able to deflect in a springing manner perpendicular to the longitudinal direction and being fastened by only one of its ends to the first object, with its other end projecting freely, said scale carrier being positively guided in the region of the scanning head, said method comprising the step of using said length measurement system for measuring the deflection of a centrifugal drum relative to its housing frame in washing machines or spin driers wherein the first object is the drum and the second object is the frame.

* * * * *